US007127071B2

(12) United States Patent
Rui et al.

(10) Patent No.: US 7,127,071 B2
(45) Date of Patent: Oct. 24, 2006

(54) SYSTEM AND PROCESS FOR ROBUST SOUND SOURCE LOCALIZATION

(75) Inventors: Yong Rui, Sammamish, WA (US); Dinei Florencio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/267,678

(22) Filed: Nov. 4, 2005

(65) Prior Publication Data

US 2006/0215850 A1 Sep. 28, 2006

Related U.S. Application Data

(63) Continuation of application No. 10/446,924, filed on May 28, 2003, now Pat. No. 6,999,593.

(51) Int. Cl.
*H04R 3/00* (2006.01)
*H04N 7/14* (2006.01)

(52) U.S. Cl. ...................................... 381/92; 348/14.08

(58) Field of Classification Search ..................... None
See application file for complete search history.

(56) References Cited

U.S. PATENT DOCUMENTS 4,802,227 A * 1/1989 Elko et al. .................... 381/92
5,737,431 A * 4/1998 Brandstein et al. ........... 381/92
6,469,732 B1 * 10/2002 Chang et al. ............ 348/14.08
6,999,593 B1 * 2/2006 Rui et al. ..................... 381/92

* cited by examiner

*Primary Examiner*—Laura A. Grier
(74) *Attorney, Agent, or Firm*—Lyon & Harr, LLP; Richard T. Lyon

(57) ABSTRACT

A system and process for finding the location of a sound source using direct approaches having weighting factors that mitigate the effect of both correlated and reverberation noise is presented. When more than two microphones are used, the traditional time-delay-of-arrival (TDOA) based sound source localization (SSL) approach involves two steps. The first step computes TDOA for each microphone pair, and the second step combines these estimates. This two-step process discards relevant information in the first step, thus degrading the SSL accuracy and robustness. In the present invention, direct, one-step, approaches are employed. Namely, a one-step TDOA SSL approach and a steered beam (SB) SSL approach are employed. Each of these approaches provides an accuracy and robustness not available with the traditional two-step approaches.

6 Claims, 8 Drawing Sheets

Table 1 - Comparison between 1-TDOA approaches

| Wrong count | | Reverberation time (ms) | | | | | | | SNR (db) | | | | | | |
|---|---|---|---|---|---|---|---|---|---|---|---|---|---|---|---|
| | | 0 | 50 | 100 | 150 | 200 | 250 | 300 | 0 | 5 | 10 | 15 | 20 | 25 | 30 |
| θ | New | 0 | 4 | 7 | 17 | 27 | 53 | 82 | 47 | 13 | 7 | 4 | 4 | 4 | 4 |
| | Phat | 2 | 5 | 10 | 10 | 20 | 45 | 75 | 80 | 19 | 10 | 6 | 4 | 4 | 4 |
| | ML | 0 | 1 | 20 | 76 | 124 | 172 | 230 | 36 | 23 | 20 | 27 | 27 | 28 | 26 |

FIG. 5

Table 2 - Comparison between SB approaches

| Wrong count | | Reverberation time (ms) | | | | | | | SNR (db) | | | | | | |
|---|---|---|---|---|---|---|---|---|---|---|---|---|---|---|---|
| | | 0 | 50 | 100 | 150 | 200 | 250 | 300 | 0 | 5 | 10 | 15 | 20 | 25 | 30 |
| θ | New | 1 | 5 | 6 | 17 | 27 | 52 | 89 | 44 | 11 | 6 | 5 | 4 | 4 | 4 |
| | Phat | 2 | 5 | 9 | 10 | 21 | 50 | 75 | 78 | 19 | 9 | 6 | 5 | 4 | 4 |
| | ML | 0 | 1 | 20 | 79 | 122 | 172 | 226 | 33 | 22 | 20 | 29 | 28 | 28 | 27 |

FIG. 6

Table 3 - Comparison between 2-TDOA, 1-TDOA and SB using tests R and S.

| Wrong count | | Reverberation time (ms) | | | | | | | SNR (db) | | | | | | |
|---|---|---|---|---|---|---|---|---|---|---|---|---|---|---|---|
| | | 0 | 50 | 100 | 150 | 200 | 250 | 300 | 0 | 5 | 10 | 15 | 20 | 25 | 30 |
| θ | 2TDOA | 4 | 4 | 12 | 25 | 49 | 80 | 140 | 46 | 18 | 12 | 8 | 7 | 8 | 8 |
| | 1TDOA | 0 | 4 | 7 | 17 | 27 | 53 | 82 | 47 | 13 | 7 | 4 | 4 | 4 | 4 |
| | SB | 1 | 5 | 6 | 17 | 27 | 52 | 89 | 44 | 11 | 6 | 5 | 4 | 4 | 4 |
| φ | 2TDOA | 4 | 7 | 27 | 151 | 295 | 409 | 504 | 83 | 37 | 27 | 25 | 23 | 19 | 21 |
| | 1TDOA | 0 | 3 | 11 | 54 | 133 | 210 | 276 | 17 | 14 | 11 | 9 | 7 | 7 | 7 |
| | SB | 1 | 2 | 11 | 76 | 176 | 264 | 335 | 18 | 17 | 11 | 12 | 8 | 8 | 8 |

FIG. 7

Table 4 - Comparing 2-TDOA, 1-TDOA and SB using test A

| Wrong count | | Different azimuth (degrees) | | | | | | | | | |
|---|---|---|---|---|---|---|---|---|---|---|---|
| | | 0 | 36 | 72 | 108 | 144 | 180 | 216 | 252 | 288 | 324 |
| θ | 2TDOA | 3 | 11 | 3 | 12 | 4 | 1 | 6 | 9 | 6 | 10 |
| | 1TDOA | 0 | 16 | 2 | 7 | 2 | 0 | 3 | 5 | 2 | 10 |
| | SB | 0 | 15 | 2 | 6 | 2 | 1 | 3 | 4 | 2 | 10 |
| φ | 2TDOA | 65 | 287 | 14 | 27 | 23 | 33 | 24 | 29 | 21 | 304 |
| | 1TDOA | 30 | 134 | 3 | 11 | 8 | 14 | 7 | 6 | 6 | 157 |
| | SB | 36 | 169 | 2 | 11 | 9 | 18 | 12 | 8 | 6 | 195 |

FIG. 8

SYSTEM AND PROCESS FOR ROBUST SOUND SOURCE LOCALIZATION

CROSS-REFERENCE TO RELATED APPLICATIONS

This application is a continuation of a prior application entitled "A SYSTEM AND PROCESS FOR ROBUST SOUND SOURCE LOCALIZATION" which was assigned Ser. No. 10/446,924 and filed May 28, 2003, now U.S. Pat. No. 6,999,593.

BACKGROUND

1. Technical Field

The invention is related to finding the location of a sound source, and more particularly to a multi-microphone, sound source localization system and process that employs direct approaches utilizing weighting factors that mitigate the effect of both correlated and reverberation noise.

2. Background Art

Using microphone arrays to do sound source localization (SSL) has been an active research topic since the early 1990's [2]. It has many important applications including video conferencing [1],[4],[7], surveillance, and speech recognition. There exist various approaches to SSL in the literature. So far, the most studied and widely used technique is the time delay of arrival (TDOA) based approach [2],[7],[8].

When using more than two microphones, the conventional TDOA SSL is a two-step process (referred to as 2-TDOA hereinafter). In the first step, the TDOA (or equivalently the bearing angle) is estimated for each pair of microphones. This step is performed in the cross correlation domain, and a weighting function is generally applied to enhance the quality of the estimate. In the second step, multiple TDOAs are intersected to obtain the final source location [2]. The 2-TDOA method has the advantage of being a well studied area with good weighting functions that have been investigated for a number of scenarios [2]. The disadvantage is that it makes a premature decision on an intermediate TDOA in the first step, thus throwing away useful information. A better approach would use the principle of least commitment [1]: preserve and propagate all the intermediate information to the end and make an informed decision at the very last step. Because this approach solves the SSL problem in a single step, it is referred to herein as the direct approach. While preserving intermediate data, this latter approach does have the disadvantage that it can be more computationally expensive than the 2-TDOA methods.

However, with the ever increasing computing power, researchers have started to focus more on the robustness of SSL, while concerning themselves less with computation cost [1][5][6]. Thus, the aforementioned direct approach is becoming more popular. Even so, research into the direct approach has not yet taken full advantage of the aforementioned weighting functions. The present sound source localization (SSL) system and process fully exploits the use of these weighting functions in the direct SSL approach in order to simultaneously handle reverberation and ambient noise, while achieving higher accuracy and robustness than has heretofore been possible.

It is noted that in the preceding paragraphs, as well as in the remainder of this specification, the description refers to various individual publications identified by a numeric designator contained within a pair of brackets. For example, such a reference may be identified by reciting, "reference

[1]" or simply "[1]". A listing of references including the publications corresponding to each designator can be found at the end of the Detailed Description section.

SUMMARY

The present invention is directed toward a system and process for finding the location of a sound source that employs the aforementioned direct approaches. More particularly, two direct approaches are employed. The first is a one-step TDOA SSL approach (referred to as 1-TDOA) and the second is a steered beam (SB) SSL approach. Conceptually, these two approaches are similar—i.e., finding the point in the space which yields maximum energy. More particularly, they are the same mathematically, and thus, 1-TDOA and SB SSL have the same origin. However, they differ in theoretical merits and computational complexity.

The 1-TDOA approach generally involves inputting the signal generated by each audio sensor in a microphone array, and then selecting as the location of the sound source, a location that maximizes the sum of the weighted cross correlations between the input signal from a first sensor and the input signal from the second sensor for pairs of array sensors. The cross correlations are weighted using a weighting function that enhances the robustness of the selected location by mitigating the effect of uncorrelated noise and/or reverberation. Tested versions of the present system and process computed the aforementioned cross correlations the FFT domain. However, in general, the cross correlations could be computed in any domain, e.g., FFT, MCLT (modulated complex lapped transforms), or time domains In the tested versions of the present system and process, the aforementioned sum of the weighted cross correlations is computed via the equation $$\sum_f \sum_r^M \sum_{s\neq r}^M |W_{rs}(f)X_r(f)X_s^*(f)\exp(-j2\pi f(\tau_r-\tau_s))|^2,$$

where r and s refer to the first and second sensor, respectively, of each pair of array sensors of interest, $X_r(f)$ is the N-point FFT of the input signal from the first sensor in the sensor pair, $X_s(f)$ is the N-point FFT of the input signal from the second sensor in the sensor pair, $\tau_r$ is the time it takes sound to travel from the selected sound source location to the first sensor of the sensor pair, $\tau_s$ is the time it takes sound to travel from the selected sound source location to the second sensor of the sensor pair, such that $X_r(f)X_s^*(f)\exp(-j2\pi f(\tau_r-\tau_s))$ is the FFT of the cross correlation shifted in time by $\tau_r-\tau_s$, and where $W_{rs}$ is the weighting function. The weighting function employed in the tested versions of the present system and process is computed as $$\frac{|X_r(f)||X_s(f)|}{2q|X_r(f)|^2|X_s(f)|^2+(1-q)|N_s(f)|^2|X_r(f)|^2+|N_r(f)|^2|X_s(f)|^2},$$

where $|N_r(f)|^2$ is the estimated noise power spectrum associated with the signal from the first sensor of the sensor pair, $|N_s(f)|^2$ is noise power spectrum associated with the signal from the second sensor of the sensor pair, and q is a prescribed proportion factor that ranges between 0 and 1.0 and is set to an estimated ratio between the energy of the reverberation and total signal.

Due to precision and computation requirements, the sum of the weighted cross correlations can be computed for a set of candidate points. In addition, it may be advantageous to employ a gradient descendent procedure to find the location that maximizes sum of the weighted cross correlations. This gradient descendent procedure is preferably computed in a hierarchical manner.

As for the SB SSL approach, this also generally involves first inputting the signal generated by each audio sensor of the aforementioned microphone array. Then, the location of the sound source is selected as the location that maximizes the energy of each sensor of the microphone array. The input signals are again weighted using a weighting function that enhances the robustness of the selected location by mitigating the effect of uncorrelated noise and/or reverberation. In tested versions of the system and process the energy is computed in FFT domain. However, in general, the energy can be computed in any domain, e.g., FFT, MCLT (modulated complex lapped transforms), or time domains.

In the tested versions of the present system and process, the aforementioned sum of the energy of the weighted input signals from the sensors is computed via the equation $$\left|\sum_{m=1}^{M} V_m(f)X_m(f)\exp(-j2\pi f\tau_m)\right|^2,$$

where m refers the sensor of the microphone array under consideration, $X_m(f)$ is the N-point FFT of the input signal from the $m^{th}$ array sensor, $\tau_m$ is the time it takes sound to travel from the selected sound source location to the $m^{th}$ array sensor, and $V_m$ is the weighting function. The weighting function employed in the tested versions of the present system and process is computed as $$\frac{1}{q|X_m(f)| + (1-q)|N_m(f)|},$$

where $|N_m(f)|$ is the N-point FFT of the noise portion of the input signal from the $m^{th}$ array sensor, and q is the aforementioned prescribed proportion factor.

Due to precision and computation requirements, the sum of the weighted cross correlations can be computed for a set of candidate points. In addition, it is advantageous to employ a gradient descendent procedure to find the location that maximizes sum of the weighted cross correlations. This gradient descendent procedure is preferably computed in a hierarchical manner.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIG. 5 is a table comparing the accuracy of the sound source location results for existing 1-TDOA SSL approaches to a 1-TDOA SSL approach according to the present invention.

FIG. 6 is a table comparing the accuracy of the sound source location results for existing SB SSL approaches to a SB SSL approach according to the present invention.

FIG. 7 is a table comparing the accuracy of the sound source location results for an existing 2-TDOA SSL approach to the 1-TDOA SSL and SB SSL approaches according to the present invention while varying either the reverberation time or signal-to-noise ratio (SNR).

FIG. 8 is a table comparing the accuracy of the sound source location results for an existing 2-TDOA SSL approach to the 1-TDOA SSL and SB SSL approaches according to the present invention while varying the sound source location.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
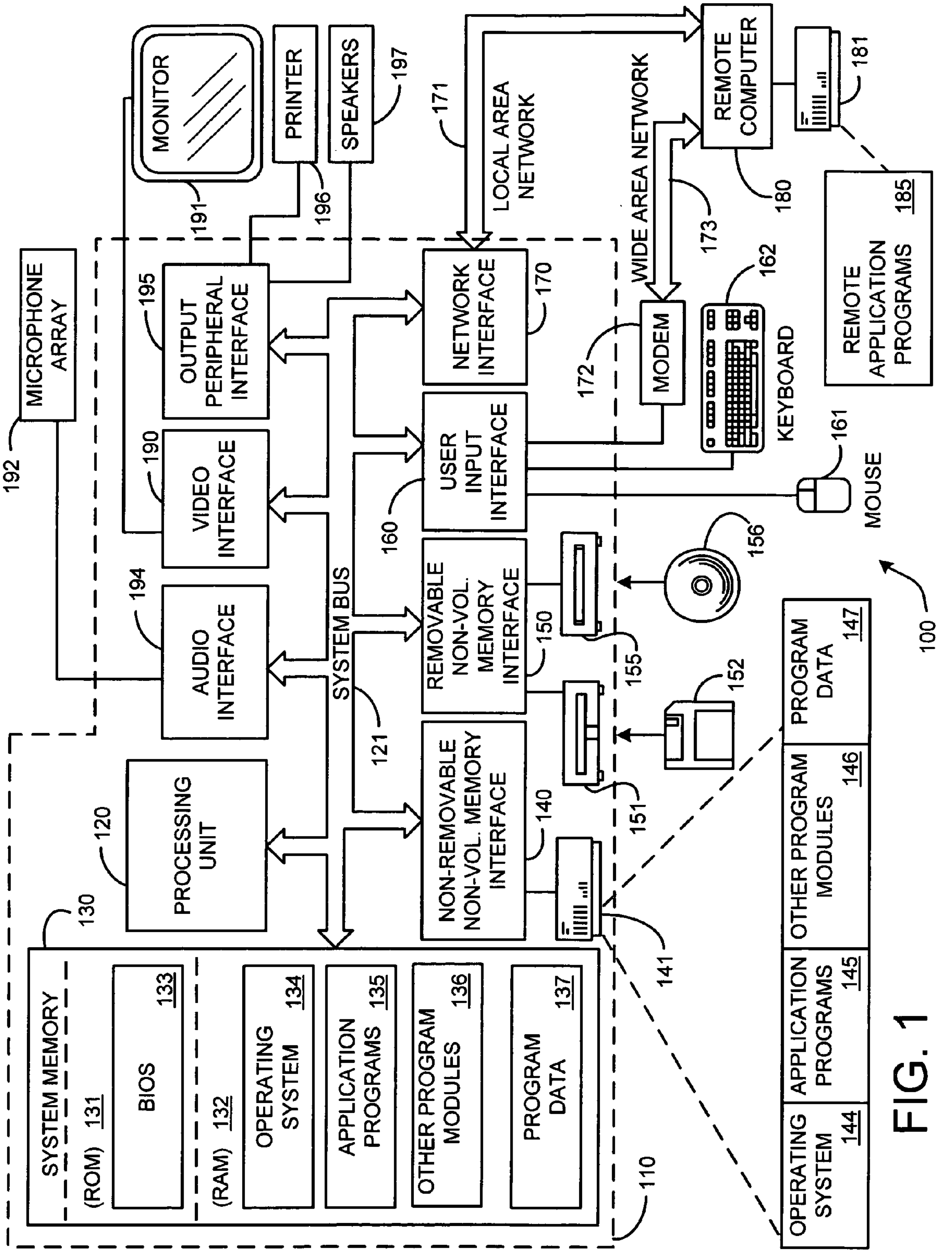
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a joystick, game pad, satellite dish, scanner, camera, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a microphone array 192, and/or a number of individual microphones (not shown) are included as input devices to the personal computer 110. The signals from the microphone array 192 (and/or individual microphones if any) are input into the computer 110 via an appropriate audio interface 194. This interface 194 is connected to the system bus 121, thereby allowing the signals to be routed to and stored in the RAM 132, or one of the other data storage devices associated with the computer 110.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description section will be devoted to a description of the program modules embodying the invention.

2.0. Steered Beam SSL And 1-TDOA SSL

This section describes two direct approach techniques for SSL that can be modified in accordance with the present invention to incorporate the use of weighting functions to not only handle reverberation and ambient noise, but at the same time achieving higher accuracy and robustness in comparison to existing methods. The first technique is a one-step TDOA SSL method (referred to as 1-TDOA), and the second technique is a steered beam (SB) SSL method. The commonality between these two approaches is that they both localize the sound source through hypothesis testing. Namely, a sound source location is chosen as the point in the space which produces the highest energy.

More particularly, let M be the number of microphones in an array. The signal received at microphone m, where m=1,. . . , M, at time n can be modeled as:

$$x_m(n)=h_m(n)*s(n)+n_m(n) \quad (1)$$

where $n_m$(n) is additive noise, and $h_m$(n) represents the room impulse response associated with reverberation noise. Even if we disregard reverberation, the signal will arrive at each microphone at different times. In general, SB SSL selects the location in space which maximizes the sum of the delayed received signals. To reduce computation cost, usually only a finite number of locations L are investigated. Let P(l) and E(l), l=1,. . . , L, be the location and energy of point l. Then the selected sound source location P*(l) is:

$$p^*(l) = \underset{l}{\operatorname{argmax}}\{E(l)\} \quad (2)$$

$$E(l) = \left|\sum_{m=1}^{M} x_m(n-\tau_m)\right|^2 \quad (3)$$

where $\tau_m$ is the time that takes sound to travel from the source to microphone m. Equation (3) can also be expressed in the frequency domain:

$$E(l) = \left|\sum_{m=1}^{M} X_m(f)\exp(-j2\pi f\tau_m)\right|^2 \quad (4)$$

where $X_m$(f) is the Fourier transform of $x_m$(n). If the terms in Equation (4) are explicitly expanded, the result is:

$$E(l) = \sum_{m=1}^{M} |X_m(f)|^2 + \sum_{r=1}^{M}\sum_{s\neq r}^{M} |X_r(f)X_s^*(f)e^{-j2\pi f(\tau_r-\tau_s)}|^2 \quad (5)$$

Note that the first term in Equation (5) is constant across all points in space. Thus it can be eliminated for SSL purposes. Equation (5) then reduces to summations of the cross correlations of all the microphone pairs in the array. The cross correlations in Equation (5) are exactly the same as the cross correlations in the traditional 2-TDOA approaches. But instead of introducing an intermediate variable TDOA, Equation (5) retains all the useful information contained in the cross correlations. It solves the SSL problem directly by selecting the highest E(l). This approach is referred to as 1-TDOA.

Note further that Equations (4) and (5) are the same mathematically. 1-TDOA and SB, therefore, have the same origin. But they differ in theoretical merits and computation complexity, which will be discussed next.

2.1. Theoretical Merits

Computing E(l) in frequency domain provides the flexibility to add weighting functions. Equations (4) and (5) then become:

$$E(l) = \left|\sum_{m=1}^{M} V_m(f)X_m(f)\exp(-j2\pi f\tau_m)\right|^2 \quad (6)$$

$$E'(l) = \sum_{r}^{M}\sum_{s\neq r}^{M} |W_{rs}(f)X_r(f)X_s^*(f)\exp(-j2\pi f(\tau_r-\tau_s))|^2 \quad (7)$$

where $V_m$(f) and $W_{rs}$(f) are the filters (weighting functions) for individual channels m and a pair of channels r and s.

Finding the optimal $V_m$(f) for SSL is a challenging task. As pointed out in [5], it depends on the nature of source and noise, and on the geometry of the microphones. While heuristics can be used to obtain $V_m$(f), they may not be optimal. On the other hand, the weighting function $W_{rs}$(f) is the same type of weighting function used in the traditional 2-TDOA SSL methods.

2.2. Computational Complexity

The points in the 3D space that have the same time delay for a given pair of microphones form a hyperboloid. Different time delay values give origin to a family of hyperboloids centered at the midpoint of microphone pair. Therefore, any point in 3D space has its mapping to the 1D cross correlation curve of this pair of microphones. This observation facilitates the efficient computation of E'(l) (7).

Figure 2:
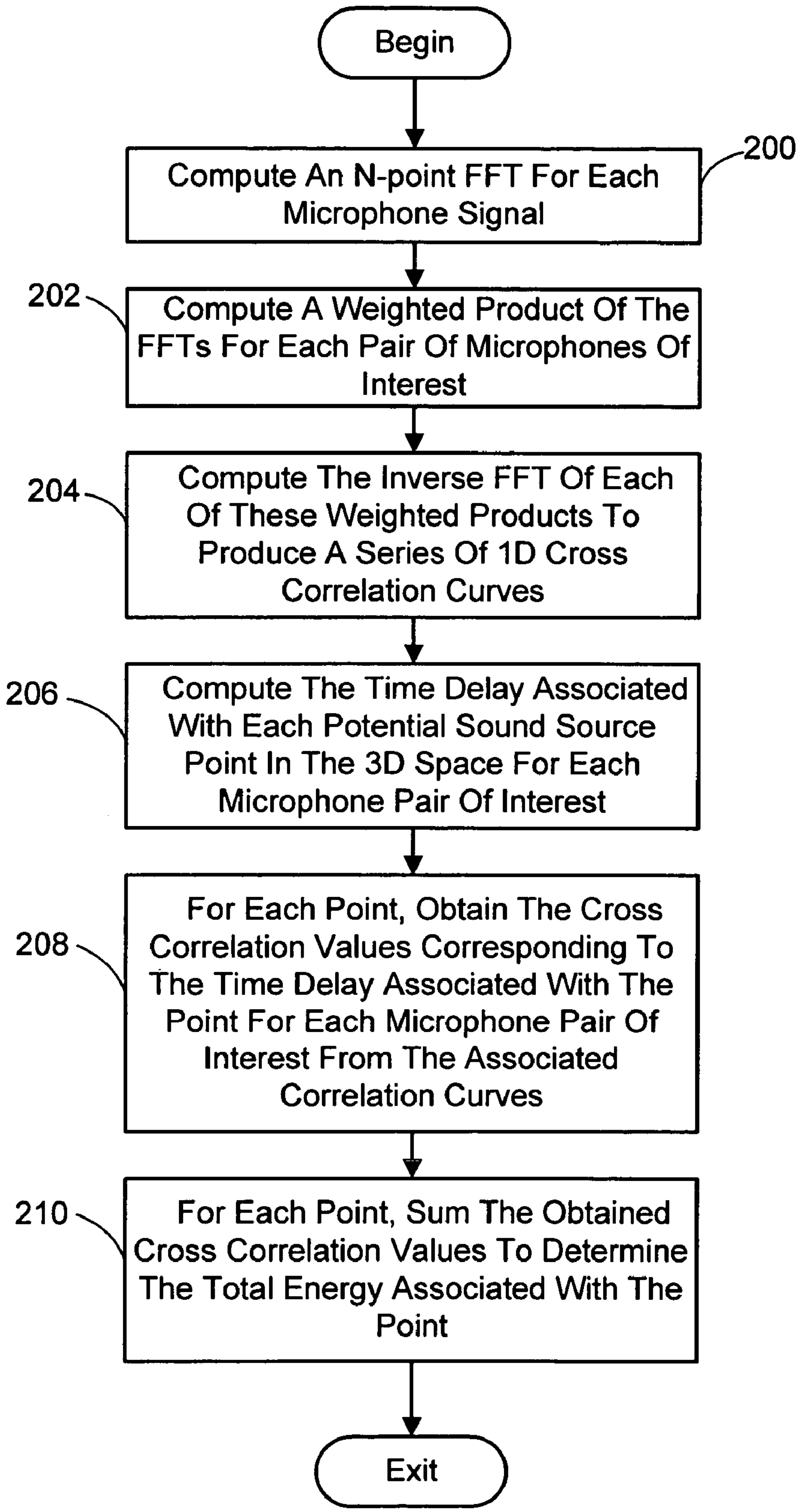
FIG. 2 is a flow chart diagramming a first embodiment of a sound source localization process employing a direct 1-TDOA approach according to the present invention FIGS. 3A & B are a flow chart diagramming a second embodiment of a sound source localization process employing a direct 1-TDOA approach according to the present invention.

More particularly, referring to FIG. 2, for the 1-TDOA SSL technique the energy associated with a point in the 3D space can be computed as indicated in process action 200 by first computing an N-point FFT for each microphone signal $x_m$(n) to produce $X_m$(f). It is noted that even though a FFT is used in the example of FIG. 2 to describe one implementation of the procedure, it is understood that it can be implemented in any other domain, e.g., MCLT or time domain. Next, in process action 202 the weighted product of the transform for each pair of microphones of interest is computed, i.e., $W_{rs}(f)X_r(f)X_s(f)^*$. It is noted that a pair of interest is defined as including all possible pairing of the microphones or any lesser number of pairs in all the embodiments of the present invention. The inverse FFT (or the inverse of other transforms as appropriate) of each of these weighted products is then computed to produce a series of 1D cross correlation curves that maps any point in the 3D space to a particular cross correlation value (process action 204). Specifically, each correlation curve identifies the cross correlation values associated with a potential sound source point for a particular time delay. The time delay of a point is simply computed (process action 206) for each microphone pair of interest as the difference between the distances from the point to the first microphone of the pair and to the second microphone of the pair, multiplied by the speed of sound in the 3D space. Given the time delay associated with a point for each of the microphone pairs of interest, all that needs to be done is to obtain the cross correlation values associated with the point from the correlation curves of each microphone pair (process action 208). The values found from the correlation curves for the microphone pairs of interest are then summed to determine the total energy associated with a point under consideration (process action 210). The point found to have the highest total energy value is the sound source location.

However, it is noted that the foregoing computation can be made even more efficient by pre-computing the cross correlation values from the cross correlation curves for all the microphone pairs of interest. This makes computing E'(l) just a look-up and summation process. In other words, it is possible to pre-compute the cross correlation values for each pair of microphones of interest and build a look-up table. The cross-correlation values can then be "looked-up" from the table rather than computing them on the fly, thus reducing the computation time required.

It is further noted that the aforementioned part of the process of computing the transform of the microphone signals and then obtaining the weighted sum of two transformed signals is typically done for a discrete number of time delays. Thus, the resolution of each of the resulting correlation curves will reflect these time delay values. If this is the case, it is necessary to interpolate the-cross correlation value from the existing values on the curve if the desired time delay valued falls between two of the existing delay values. This makes the use of a pre-computed table even more attractive as the interpolation can be done ahead of time as well.

There is a question of the resolution of the table to consider as well. It is generally known that SSL processes are accurate to about one degree of the direction to the sound source, where the sound source direction is measured as the angle formed between a point midway between the microphone pair under consideration and the sound source. Further, it is noted that the sound source direction can be geometrically and mathematically related to the time delay values of the cross correlation curves via conventional methods. Thus, given this general resolution limit, the cross correlation values for the table can be computed (either by obtaining them directly from one of the curves or interpolating them from the curves) for time delay value increments corresponding to each one degree change in the direction.

Comparing the main process actions and computation complexity between 1-TDOA SSL and SB SSL yields the following. For 1-TDOA SSL the main process actions include:

1) Computing the N-point FFT $X_m(f)$ for the M microphones: O(MNlogN).
2) Let $Q=c_M^2$ be the number of the microphone pairs formed from the M microphones. For the Q pairs, computing $W_{rs}(f)X_r(f)X_s(f)^*$ according to Equation (7): O(QN).
3) For the Q pairs, computing the inverse FFT to obtain the cross correlation curve: O(QNlogN).
4) For the L points in the space, computing their energies by table look-up from the Q interpolated correlation curves: O(LQ).

Therefore, the total computation cost for 1-TDOA SSL is O(MNlogN+Q(N+NlogN+L)).

The main process actions for SB SSL include:

1) Computing N-point FFT $X_m(f)$ for the M microphones: O(MNlogN).
2) For the L locations and M microphones, phase shifting $X_m(f)$ by $2\pi f\tau_m$ and weighting it by $V_m(f)$ according to Equation (6): O(MNL).
3) For the L locations, computing the energy: O(LN).

The total computation cost is therefore O(MNlogN+L(MN+N)).

The dominant term in 1-TDOA SSL is QNlogN and the dominant term in BS-SSL is LMN. If QlogN is bigger than LM, then SB SSL is cheaper to compute. Furthermore, it is possible to do SB SSL in a hierarchical way, which can result in further savings. On the other hand, applying weighting functions to 1-TDOA may result in better performance.

2.3. Summary

Based on the above analysis, a few general recommendations can be provided for selecting a SSL algorithm family. First, if using only 2 microphones, use 2-TDOA based SSL. Because of its well studied weighting functions, it will provide better results with no added complexity. Second, for multiple (>2) microphones, use direct algorithms for better accuracy. Only consider 2-TDOA if computational resources are extremely scarce, and source location is 2-D or 3-D. Third, if accuracy is important, prefer 1-TDOA over SB, because of the better studied weighting functions can be applied to it. Finally, if QNlogN<LM, use 1-TDOA SSL for lower computational cost and better performance.

3.0. Propodes Approaches

In the field of SSL, there are two branches of research being done in relative isolation. On one hand, various weighting functions have been proposed in 2-TDOA. But 2-TDOA is inherently less robust. On the other hand, 1-TDOA SSL and SB SSL are more robust but their weighting function choices have not been adequately explored. In this section, two new approaches are proposed using a new weighting function in conjunction with these direct approaches, which simultaneously handles ambient noise and reverberation.

3.1. A New 1-TDOA SSL Approach

Most existing 1-TDOA SSL approaches use either PHAT or ML as the weighting function, [1][5]:

$$W_{PHAT}(f) = \frac{1}{|X_1(f)||X_2(f)|} \quad (8)$$

-continued $$W_{ML}(f)=\frac{|X_1(f)||X_2(f)|}{|N_2(f)|^2|X_1(f)|^2+|N_1(f)|^2|X_2(f)|^2} \quad (9)$$

PHAT works well only when the ambient noise is low. Similarly, ML works well only when the reverberation is small. The present sound source localization system and process employs a new maximum likelihood estimator that is effective when both ambient noise and reverberation are present. This weighting function is:

$$W_{MLR}(f)=\frac{|X_1(f)||X_2(f)|}{2q|X_1(f)|^2|X_2(f)|^2+(1-q)|N_2(f)|^2|X_1(f)|^2+|N_1(f)|^2|X_2(f)|^2} \quad (10)$$

where q is a proportion factor that ranges between 0 and 1.0 and is set to the estimated ratio between the energy of the reverberation and total signal (direct path plus reverberation) at the microphones.

Figure 3A:
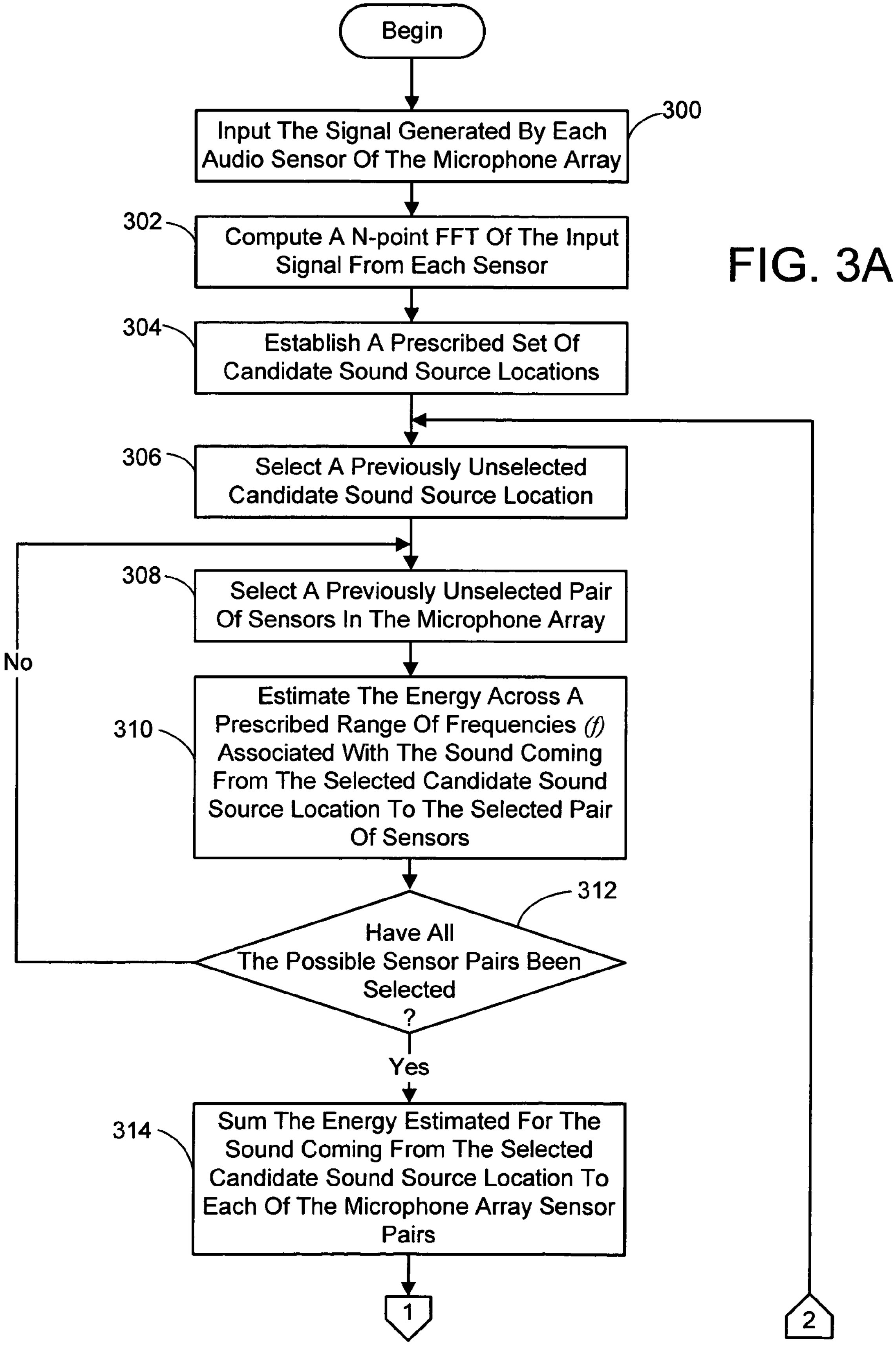
Figure 3B:
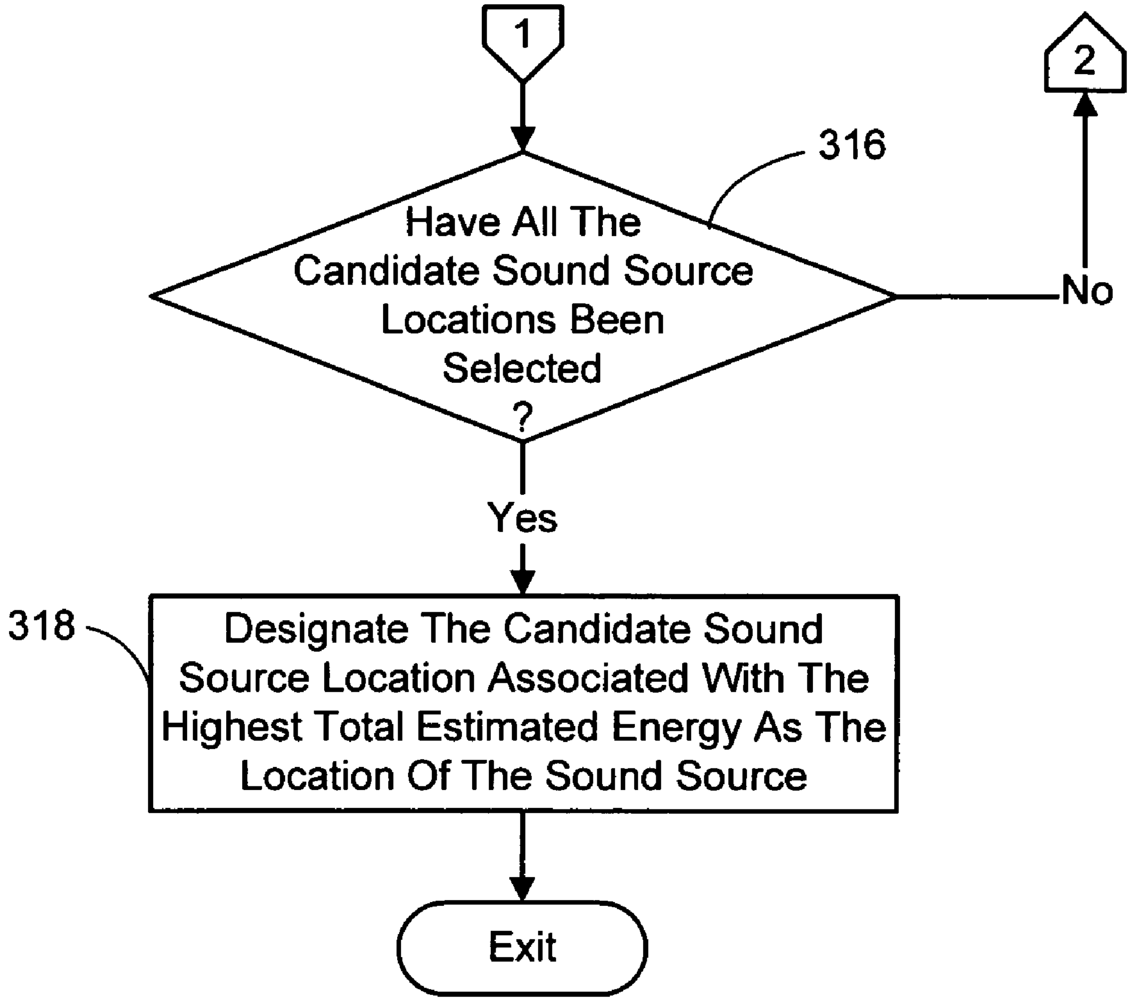

Substituting Equation (10) into (7) produces the aforementioned new 1-TDOA approach, which is outlined in FIGS. 3A & B as follows. First, the signal generated by each audio sensor of the microphone array is input (process action 300), and an N-point FFT of the input signal from each sensor is computed (process action 302) where N refers to the number of sample points taken from the signal. Next, a prescribed set of candidate sound source locations is established (process action 304) and a previously unselected one of these candidate sound source locations is selected (process action 306). In addition, in process action 308, a previously unselected pair of sensors in the microphone array is selected. The cross correlation between the two microphones across a prescribed range of frequencies (f) associated with the sound coming from the selected candidate sound source location to the selected pair of sensors is then estimated in process action 310 via the aforementioned equation, $$|W_{rs}(f)X_r(f)X_s^*(f)\exp(-j2\pi f(\tau_r-\tau_s))|^2,$$

where $W_{rs}(f)$ is defined as, $$\frac{|X_r(f)||X_s(f)|}{2q|X_r(f)|^2|X_s(f)|^2+(1-q)|N_s(f)|^2|X_r(f)|^2+|N_r(f)|^2|X_s(f)|^2}.$$

It is then determined if all the sensor pairs of interest have been selected (process action 312). If not, process actions 308 through 312 are repeated as shown in FIG. 3A. However, if all the sensor pairs have been considered, then in process action 314, the energy estimated for the sound coming from the selected candidate sound source location to each of the microphone array sensor pairs is summed. It is next determined if all the candidate sound source locations have been selected (process action 316). If not, process actions 306 through 316 are repeated. Whereas, if all the candidate locations have been considered, the candidate sound source location associated with the highest total estimated energy is designated as the location of the sound source (process action 318).

3.2. A New SB SSL Approach

There exists a rich literature on weighting functions for beam forming for speech enhancement [3]. But so far little research has been done in developing good weighting functions $V_m(f)$ for SB SSL. Weighting functions for audio capturing and enhancement, and SSL, have related but different objectives. For example, SSL does not care about the quality of the captured audio, as long as the location estimation is accurate. Most of the existing SB SSL methods use no weighting functions, e.g., [6]. While it is challenging to find the optimal weights, reasonably good solutions can be obtained by using observations obtained from the new 1-TDOA SSL described above. If the following approximations are made:

$$|X_1(f)X_2(f)|=|X_1(f)|^2=|X_2(f)|^2|N(f)|^2=|N_1(f)|^2=|N_2(f)|^2 \quad (11)$$

an approximated weighting function to (10) is obtained:

$$W_{AMLR}(f)=\frac{1}{q|X_1(f)||X_2(f)|+(1-q)|N_1(f)||N_2(f)|} \quad (12)$$

The benefit of this approximated weighting function is that it can be decomposed into two individual weighting functions for each microphone. A good choice for $V_m(f)$ is therefore:

$$V_m(f)=\frac{1}{q|X_m(f)|+(1-q)|N_m(f)|} \quad (13)$$

Figure 4A:
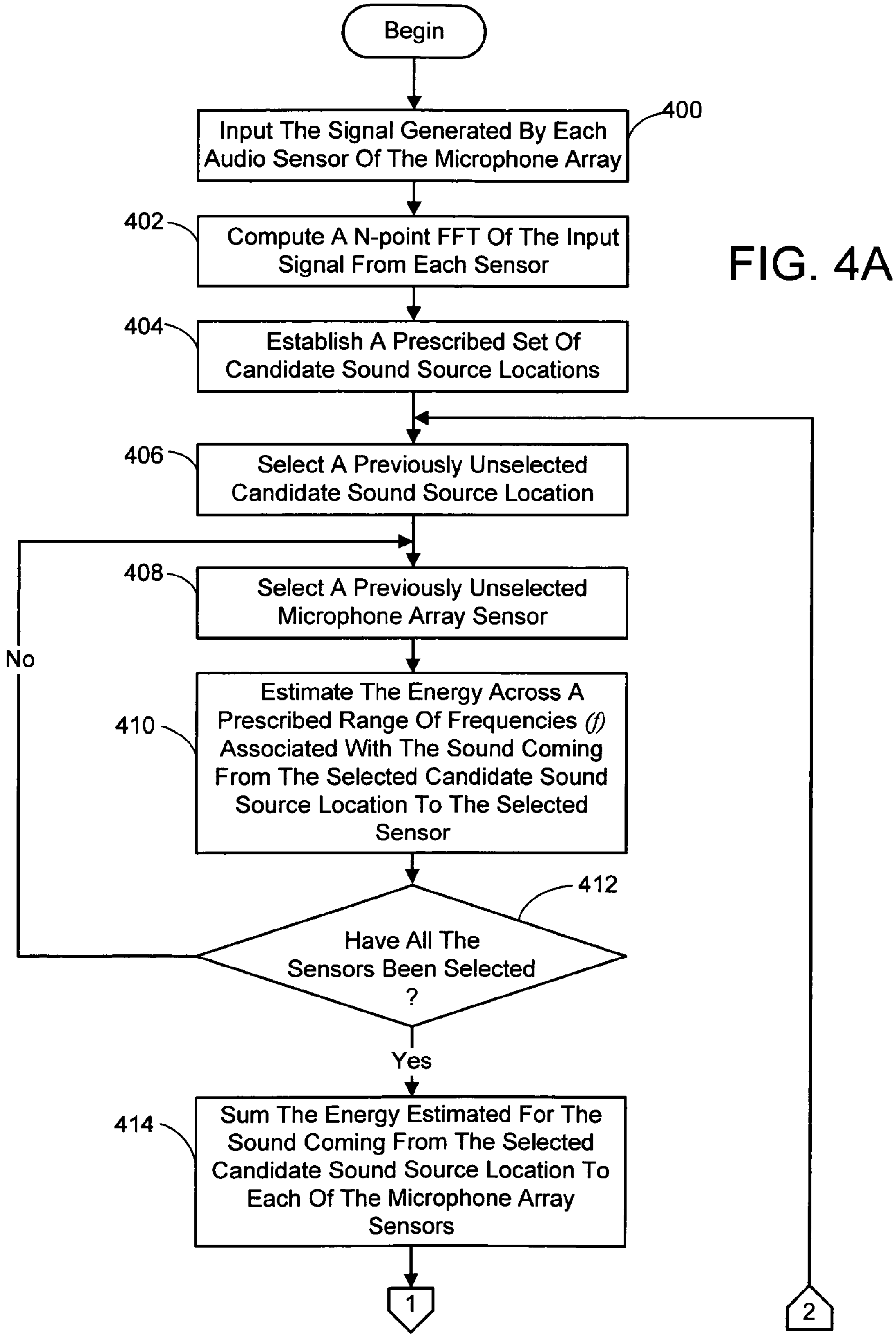
FIGS. 4A & B are a flow chart diagramming a sound source localization process employing a direct steered beam (SB) approach according to the present invention.
Figure 4B:
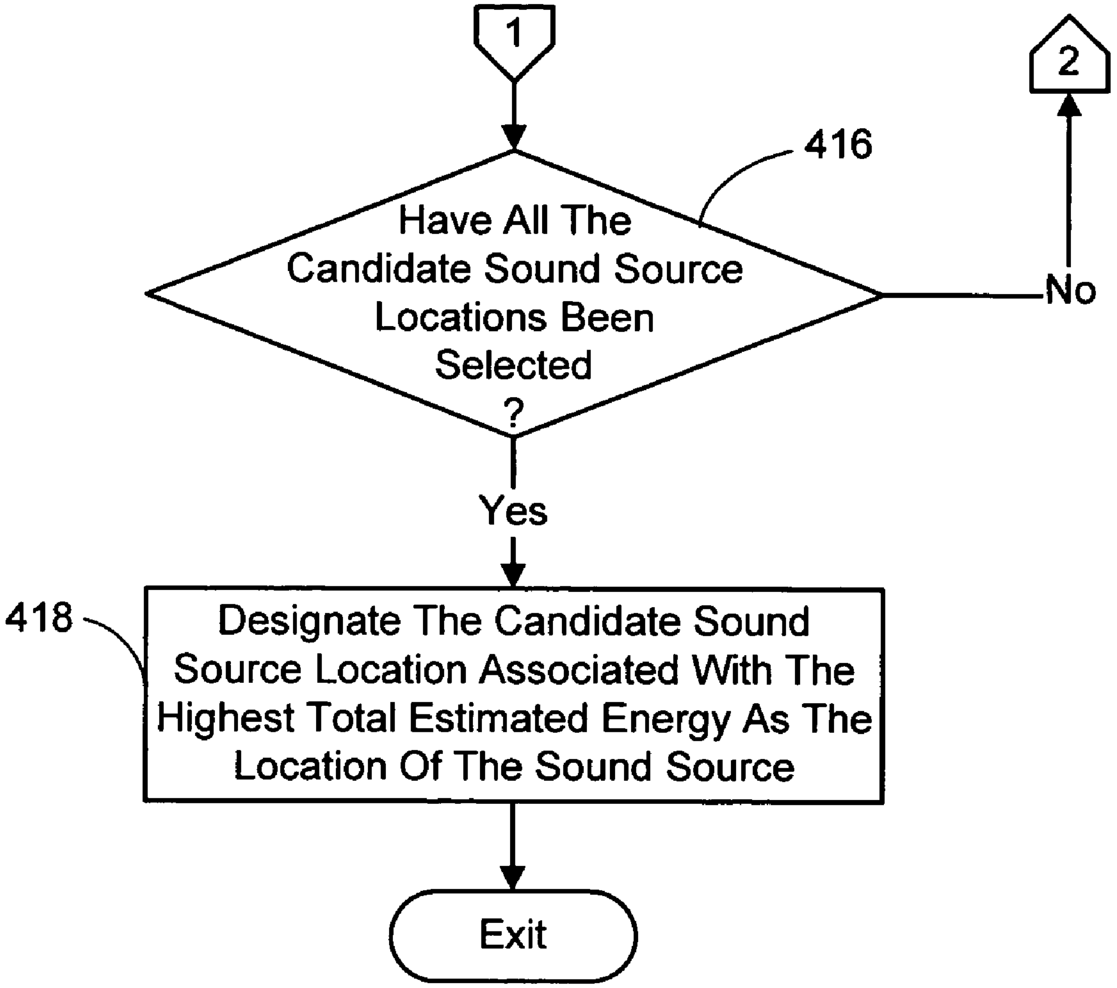

Substituting Equation (13) into (6) produces the aforementioned new SB SSL approach, which is outlined in FIGS. 4A & B as follows. First, the signal generated by each audio sensor of the microphone array is input (process action 400), and an N-point FFT of the input signal from each sensor is computed (process action 402). Next, a prescribed set of candidate sound source locations is established (process action 404) and a previously unselected one of these candidate sound source locations is selected (process action 406). In addition, in process action 408, a previously unselected sensor of the microphone array is selected. The energy across a prescribed range of frequencies (f) associated with the sound coming from the selected candidate sound source location to the selected sensor is then estimated in process action 410 via the aforementioned equation, $|V_m(f)X_m(f)\exp(-j2\pi f\tau_m)|^2$, where $V_m(f)$ is defined as, $$\frac{1}{q|X_m(f)|+(1-q)|N_m(f)|}.$$

It is then determined if all the sensors have been selected (process action 412). If not, process actions 408 through 412 are repeated. However, if all the sensors have been considered, then in process action 414, the energy estimated for the sound coming from the selected candidate sound source location to each of the microphone array sensors is summed. It is next determined if all the candidate sound source locations have been selected (process action 416). If not, process actions 406 through 416 are repeated. Whereas, if all the candidate locations have been considered, the candidate sound source location associated with the highest total estimated energy is designated as the location of the sound source (process action 418).

3.3. Alternate Approaches

It is noted that the above-described 1-TDOA and SB SSL approaches represents the full scale versions thereof. However, less inclusive versions are also feasible and within the scope of the present invention. For example, rather than computing the N-point FFT of the input signal from each sensor, other transforms could be employed instead. It would even be feasible to keep the signals in the time domain. Further, albeit processor intensive, the foregoing procedure could be employed for all possible points rather than a few candidate points and all possible frequencies rather than a prescribed range. The search could be based on a gradient descend or other optimization method, instead of searching over the candidate points. Still further, it would be possible to forego the use of the optimized weighting functions described above and to use generic ones instead.

4.0 Experimental Results

We focused on three sets of comparisons through extensive experiments: 1) the proposed new 1-TDOA technique against existing 1-TDOA techniques; 2) the proposed new SB technique against existing SB techniques; and 3) comparing the 2-TDOA, 1-TDOA and SB SSL techniques in general.

4.1. Testing Data Description

We tested our system both by putting it into an actual meeting room and by using synthesized data. Because it is easier to obtain the ground truth (e.g., source location, SNR and reverberation time) for the synthesized data, we report our experiments on this set of data. We take great care to generate realistic testing data. We use the imaging method to simulate room reverberation. To simulate ambient noise, we captured actual office fan noise and computer hard drive noise using a close-up microphone. The same room reverberation model is then used to add reverberation to these noise signals, which are then added to the reverberated desired signal. We make our testing data as difficult as, if not more difficult than, the real data obtained in our actual meeting room.

The testing data setup corresponds to a 6 m×7 m×2.5 m room, with eight microphones arranged in a planar ring-shaped array, 1 m from the floor and 2.5 m from the 7 m wall. The microphones are equally spaced, and the ring diameter is 15 cm. Our proposed approaches work with 1D, 2D or 3D SSL. Here we focus on the 1D and 2D cases: the azimuth $\theta$ and elevation $\phi$ of the source with respect to the center of the microphone array. For $\theta$, the whole 0°–360° range is quantized into 360°/4°=90 levels. For $\phi$, because of our tele-conferencing scenario, we are only interested in $\phi$=[50°, 90°], i.e., if the array is put on a table, $\phi$=[50°, 90°] covers the range of meeting participant's head position. It is quantized into (90°–50°)/5°=8 levels. For the whole $\theta$–$\phi$ 2D space, the number of cells L=90*8=720.

We designed three sets of data for the experiments:

Test A: Varies $\theta$ from 0° to 360° in 36° steps, with fixed $\phi$=65°, SNR=10 dB, and reverberation time $T_{60}$=100 ms;

Test R: Varies the reverberation time $T_{60}$ from 0 ms to 300 ms in 50 ms steps, with fixed $\theta$=108°, $\phi$=65°, and SNR=10 dB;

Test S: Varies the SNR from 0 db to 30 db in 5 dB steps, with fixed $\theta$=108°, $\phi$=65°, and $T_{60}$=100 ms.

The sampling frequency was 44.1 KHz, and we used a 1024 sample (~23 ms) frame. The raw signal is band-passed to 300 Hz–4000 Hz. Each configuration (e.g., a specific set of $\theta$, $\phi$, SNR and $T_{60}$) of the testing data is 60-second long (2584 frames) and about 700 frames are speech frames. The results reported in this section are from all of the 700 frames.

4.2. Experiment 1: 1-TDOA SSL

Table 1 shown in FIG. 5 compares the proposed 1-TDOA approach to the existing 1-TDOA methods. The left half of the table is for Test R and the right half is for Test S. The numbers in the table are the "wrong count", defined as the number of estimations that are more than 10° from the ground truth (i.e., higher is worse).

4.3. Experiment 2: SB SSL

The comparison between the proposed new SB approach against existing SB approaches is summarized in Table 2 as shown in FIG. 6.

4.4. Experiment 3: 2-TDOA vs. 1-TDOA vs. SB

The comparison between the proposed new 1-TDOA and SB approaches against an existing 2-TDOA approach is summarized in Table 3 shown in FIG. 7. The 2-TDOA approach we used is the maximum likelihood estimator $J_{TDOA}$ developed in [2], which is one of the best 2-TDOA algorithms. In addition to using Tests R and S, we further use Test A to see how they perform with respect to different source locations. The result is summarized in Table 4 shown in FIG. 8.

4.5. Observations

The following observations can be made based on Tables 1–4:

From Table 1, the proposed new 1-TDOA outperforms the PHAT and ML based approaches. The PHAT approach works quite well in general, but performs poorly when the SNR is low. Tele-conferencing systems, e.g., [4], require prompt SSL, and the promptness often implies working with low SNR. PHAT is less desirable in this situation. A similar observation can be made from Table 2 for the SB SSL approaches.

From Tables 3 and 4, both the new 1-TDOA and the new SB approaches perform better than the 2-TDOA approach, with the 1-TDOA slightly better than the SB approach, because of its good weighting functions. This result supports our premise that 2-TDOA throws away useful information during the first step.

Because our microphone array is a ring-shaped planar array, it has better estimates for $\theta$ than for $\phi$ (see Tables 3 and 4). This is the case for all the approaches.

There are two destructive factors for SSL: the ambient noise and room reverberation. It is clear from the tables that when ambient noise is high (i.e., SNR is low) and/or when reverberation time is large, the performance of all the approaches degrades. But the degrees they degrade differ. Our proposed 1-TDOA is the most robust in these destructive environments.

5.0. REFERENCES

[1]. S. Birchfield and D. Gillmor, Acoustic source direction by hemisphere sampling, *Proc. of ICASSP,* 2001.

[2]. M. Brandstein and H. Silverman, A practical methodology for speech localization with microphone arrays, Technical Report, Brown University, Nov. 13, 1996.

[3]. M. Brandstein and D. Ward (Eds.), Microphone Arrays signal processing techniques and applications, Springer, 2001.

[4]. R. Cuter, Y. Rui, et. al., Distributed meetings: a meeting capture and broadcasting system, Proc. of ACM Multimedia, December 2002, France.

[5]. J. DiBiase, A high-accuracy, low-latency technique for talker localization in reverberant environments, PhD thesis, Brown University, May 2000.

[6]. R. Duraiswami, D. Zotkin and L. Davis, Active speech source localization by a dual coarse-to-fine search. *Proc. ICASSP* 2001.

[7]. J. Kleban, Combined acoustic and visual processing for video conferencing systems, MS Thesis, The State University of New Jersey, Rutgers, 2000.

[8]. H. Wang and P. Chu, Voice source localization for automatic camera pointing system in videoconferencing, *Proc. of ICASSP,* 1997.

[9]. D. Ward and R. Williamson, Particle filter beamforming for acoustic source localization in a reverberant environment, *Proc. of ICASSP,* 2002.

What is claimed is:

1. A computer-implemented sound source localization process for finding the location of a sound source using signals output by a microphone array having a plurality of audio sensors, comprising:

an inputting step for inputting the signal generated by each audio sensor of the microphone array; and a selecting step for selecting as the location of the sound source, a location that maximizes the sum of the weighted cross correlations between the input signal from a first sensor and the input signal from the second sensor for pairs of interest of array sensors, wherein the cross correlations are weighted using a weighting function that enhances the robustness of the selected location by mitigating the effect of uncorrelated noise and/or reverberation, and wherein the sum of the weighted cross correlations are computed via the equation $$\sum_{f} \sum_{r}^{M} \sum_{s\neq r}^{M} |W_{rs}(f)X_r(f)X_s^*(f)\exp(-j2\pi f(\tau_r-\tau_s))|^2,$$

where r and s refer to the first and second sensor, respectively, of each pair of array sensors of interest, $X_r(f)$ is the N-point FFT of the input signal from the first sensor in the sensor pair, $X_s(f)$ is the N-point FFT of the input signal from the second sensor in the sensor pair, $\tau_r$ is the time it takes sound to travel from the selected sound source location to the first sensor of the sensor pair, $\tau_s$ is the time it takes sound to travel from the selected sound source location to the second sensor of the sensor pair, such that $X_r(f)X_s^*(f)\exp(-j2\pi f(\tau_r-\tau_s))$ is the FFT of the cross correlation shifted in time by $\tau_r-\tau_r$, and where $W_{rs}$ is the weighting function.

2. A computer-readable medium having computer-executable instructions for performing the process steps recited in claim 1.

3. A computer-implemented sound source localization process for finding the location of a sound source using signals output by a microphone array having a plurality of audio sensors, comprising:

an inputting step for inputting the signal generated by each audio sensor of the microphone array;

a selecting step for selecting as the location of the sound source, a location that maximizes the sum of the energy of a weighted input signal from each sensor of the microphone array, wherein the input signals are weighted using a weighting function that enhances the robustness of the selected location by mitigating the effect of uncorrelated noise and/or reverberation, and wherein the sum of the weighted input signals from the sensors is computed via the equation $$\left|\sum_{m=1}^{M} V_m(f)X_m(f)\exp(-j2\pi f\tau_m)\right|^2,$$

where m refers the sensor of the microphone array under consideration, $X_m(f)$ is the N-point FFT of the input signal from the $m^{th}$ array sensor, $\tau_m$ is the time it takes sound to travel from the selected sound source location to the $m^{th}$ array sensor, and $V_m$ is the weighting function.

4. A computer-readable medium having computer-executable instructions for performing the process steps recited in claim 3.

5. A sound source localization process for finding the location of a sound source in a 3D space using signals output by a microphone array having a plurality of audio sensors, comprising:

a first computing step for computing a frequency transform for each sensor signal;

a second computing step for computing the weighted product of the transforms for each pair of array sensors of interest;

a third computing step for computing the inverse transform of each of the weighted products to produce a 1D cross correlation curve for each pair of array sensors of interest;

for each point of interest in the 3D space performing, a fourth computing step for computing the time delay associated the point for pairs of interest of array sensors, wherein said time delay is computed for a pair of array sensors as the difference between the distances from the point to the first microphone of the pair and to the second microphone of the pair, multiplied by the speed of sound in the 3D space, for each pair of array sensors of interest, an ascertaining step for ascertaining the correlation of the signals at that point using the correlation curve associated with that sensor pair, and a summing step for summing the correlation values obtained from each of the correlation curves to determine the total energy associated with the point under consideration; and a designating step for designating the point associated with the highest total energy as the location of the sound source.

6. A computer-readable medium having computer-executable instructions for performing the process steps recited in claim 5.

* * * * *